US012602336B2

(12) United States Patent
Chen et al.

(10) Patent No.: US 12,602,336 B2
(45) Date of Patent: Apr. 14, 2026

(54) ACCELERATOR SYSTEM AND METHOD TO EXECUTE DEPTHWISE SEPARABLE CONVOLUTION

(71) Applicant: National Cheng Kung University, Tainan City (TW)

(72) Inventors: Chung-ho Chen, Tainan City (TW); Cheng-you Xie, Tainan City (TW)

(73) Assignee: National Cheng Kung University, Tainan City (TW)

( * ) Notice: Subject to any disclaimer, the term of this patent is extended or adjusted under 35 U.S.C. 154(b) by 236 days.

(21) Appl. No.: 18/509,381

(22) Filed: Nov. 15, 2023

(65) Prior Publication Data

US 2025/0061069 A1      Feb. 20, 2025

(30) Foreign Application Priority Data

Aug. 16, 2023      (TW) .................................. 112130847

(51) Int. Cl.
*G06F 13/16* (2006.01)
*G06F 7/544* (2006.01)
*G06F 9/38* (2018.01)

(52) U.S. Cl.
CPC ........ *G06F 13/1673* (2013.01); *G06F 7/5443* (2013.01); *G06F 9/3802* (2013.01)

(58) Field of Classification Search
CPC ... G06F 13/1673; G06F 7/5443; G06F 9/3802
See application file for complete search history.

(56) References Cited

U.S. PATENT DOCUMENTS

| | | | |
|---|---|---|---|
| 10,824,939 B2 * | 11/2020 | Fang ...................... | G06N 3/063 |
| 10,977,802 B2 * | 4/2021 | Wilson .................... | G06T 7/174 |
| 2024/0176540 A1 * | 5/2024 | Cho ....................... | G06F 3/0656 |

* cited by examiner

*Primary Examiner* — Idriss N Alrobaye
*Assistant Examiner* — Richard B Franklin

(57) ABSTRACT

An accelerator system includes an off-chip memory, a bus, and an accelerator. The off-chip memory includes a first buffer. The accelerator includes a second buffer, a third buffer, a fourth buffer, an instruction fetching module, a load module, a storage module, a convolution control module, and a computation module. The instruction fetching module fetches instructions from the off-chip memory via the bus. The load module loads input data from the off-chip memory via the bus. The storage module stores the output data to the off-chip memory via the bus. The computation module performs convolution computations based on the input map and multiple kernels allocated by the convolution module. In response to loading the input data or instruction from the off-chip memory, the requested input data or instruction is transferred from the off-chip memory and temporarily stored in the first buffer.

8 Claims, 4 Drawing Sheets

ACCELERATOR SYSTEM AND METHOD TO EXECUTE DEPTHWISE SEPARABLE CONVOLUTION

CROSS REFERENCE TO RELATED APPLICATIONS

This application claims the benefit of priority of Taiwan Patent Application No. 112130847, filed on Aug. 16, 2023, the contents of which are incorporated by reference as if fully set forth herein in their entirety.

FIELD OF INVENTION

The present disclosure relates to the field of an accelerator system, and more particularly, to an accelerator system capable of executing depthwise separable convolution.

BACKGROUND OF INVENTION

Convolutional Neural Network (CNN) is a type of deep neural network that uses the convolutional layer to filter the inputs to obtain useful information. The filter of the convolutional layer can be modified based on the learning parameters to extract the most useful information for a specific task. Convolutional neural network is typically suitable for classification, detection, and identification, such as image classification, medical image analysis, and image/video identification.

There are many accelerators currently used in neural networks, such as Eyeriss, Tensor Processing Unit (TPU), DianNao family, Angel Eye, and EIE. However, for some accelerators, TPU, DaDianNao, and EIEs, they are not suitable for low-end edge devices because they require a large capacity of the on-chip memory or they require a large amount of access to the off-chip memory. Although Eyeriss and Angel Eye support filters with multiple sizes, the utilization of multiply-accumulate units (MAC) is low due to the architecture design of the processing unit or the filter mapping on the MACs.

Moreover, the computation of deep learning models usually comes with a significant amount of memory access and data transfer. Therefore, even though the computational speed of the accelerator is enhanced, its performance is not relatively improved due to that most of the computational time of accelerator are spent on waiting for accessing data from the memory and latency.

SUMMARY OF INVENTION

One objective of the present disclosure is to provide an accelerator system and method to execute depthwise separable convolution, which may effectively improve the latency of accessing data from the memory and enhance the utilization of the processing unit.

An aspect of the present disclosure is to provide an accelerator system, which includes an off-chip memory, a bus, and an accelerator. The accelerator system is suitable for deep learning architectures, particularly for convolution architectures. The off-chip memory includes a first buffer. The bus is electrically connected to the off-chip memory. The accelerator is electrically connected to the bus, and includes a second buffer, a third buffer, a fourth buffer, an instruction fetching module, a load module, a storage module, a convolution control module, and a computation module. The second buffer is electrically connected to the bus. The third buffer is electrically connected to the bus. The fourth buffer is electrically connected to the bus. The instruction fetching module is electrically connected to the second buffer and is configured to fetch at least one instruction from the off-chip memory via the bus. The load module is electrically connected to the third buffer and is configured to load at least one input data from the off-chip memory via the bus. The storage module is electrically connected to the fourth buffer and is configured to store at least one output data to the off-chip memory via the bus. The convolution control module is electrically connected to the instruction fetching module, the load module, and the storage module. The computation module is electrically connected to the convolution control module, the load module, and the storage module and is configured to perform convolution computations based on an input map and a plurality of kernels allocated by the convolution control module. In response to a request from the accelerator for loading the at least one input data or the at least one instruction from the off-chip memory, the requested at least one input data or the requested at least one instruction is transferred from the off-chip memory and temporarily stored in the first buffer.

In some embodiments of the present disclosure, in response to the request from the accelerator for loading the at least one instruction from the off-chip memory, the requested at least one instruction is transferred from the first buffer via the bus and temporarily stored in the second buffer, and the instruction fetching module fetches the at least one instruction from the second buffer and transfers the at least one instruction to the convolution control module.

In some embodiments of the present disclosure, in response to the request from the accelerator for loading the at least one input data from the off-chip memory, the requested at least one input data is transferred from the first buffer via the bus and temporarily stored in the third buffer, and the load module reads the at least one input data from the third buffer and transfers the at least one input data to the convolution control module or the computation module.

In some embodiments of the present disclosure, in response to a request from the accelerator for storing the at least one output data in the off-chip memory, the requested at least one output data is transferred from the convolution control module or the computation module by the storage module and temporarily stored in the fourth buffer.

In some embodiments of the present disclosure, in response to the request from the accelerator for storing the at least one output data in the off-chip memory, the requested at least one output data is transferred from the fourth buffer via the bus and temporarily stored in the first buffer, and stored in the off-chip memory via the first buffer.

In some embodiments of the present disclosure, a size of temporarily stored data of the first buffer unit is equal to a size of temporarily stored data of any one of the second buffer unit, the first buffer, the second buffer, and the third buffer.

In some embodiments of the present disclosure, in response to the request from the accelerator for storing the at least one output data in the off-chip memory, the requested at least one output data is temporarily stored in one of the first buffer unit and the second buffer unit, wherein when the space of the one of the first buffer unit and the second buffer unit is full, the storage module stores other output data to another of the first buffer unit and the second buffer unit, and all data in the one of the first buffer unit and the second buffer unit are transferred via the bus and temporarily stored in the first buffer.

Another aspect of the present disclosure is to provide a depthwise separable convolution method performed on the input map by the computation module of the accelerator system according to any one of the aforementioned embodiments, the size of the input map is A×B×C, wherein A, B, and C are a height, a width, and the number of channels of the input map, respectively. The computation module includes a plurality of processing units. The depthwise separable convolution method includes a depthwise convolution step and a pointwise convolution step, wherein the depthwise convolution step includes: a multiply-accumulate operation is performed, by the processing units, on the A×B input map of each channel according to a corresponding one of C S×R first kernels to obtain C first output maps, wherein S and R are a height and a width of the first kernels. The pointwise convolution step includes: the multiply-accumulate operation is performed, by the processing units, on the C first output maps according to N 1×1×C second kernels to obtain N second output maps; for each of the N second output maps, an accumulation operation is performed on the data in the same position with different channels to obtain N third output maps.

In some embodiments of the present disclosure, in the depthwise convolution step, each of the processing units parallelly performs the multiply-accumulate operation on different input data of a partial input map of the A×B input map in the $n_{th}$ channel based on the $i_{th}$ one of the C first kernels, wherein $1 \leq i \leq C$ and $1 \leq n \leq C$.

In some embodiments of the present disclosure, the computation module further includes a memory unit, where in the pointwise convolution step, for M weights of each of the N second kernels, the weights are sequentially stored in the memory unit with consecutive addresses.

In the architecture of the accelerator system provided in the present disclosure, the operation of accessing or writing data to the off-chip memory can reduce the number of accesses and waiting time, thereby reducing the overall latency. Using said accelerator system to perform the depthwise separable convolution method, the utilization of the processing units can be enhanced by performing the multiply-accumulate operation on different data in the input map with the same channel based on the same kernel, thereby improving the performance of the accelerator system.

DETAILED DESCRIPTION OF PREFERRED EMBODIMENTS

In order to make the above and other purposes, features, and advantages of the present disclosure more clearly and easily understood, the following detailed description of the preferred embodiments of the present disclosure will be provided with reference to the accompanying drawings.

Figure 1:
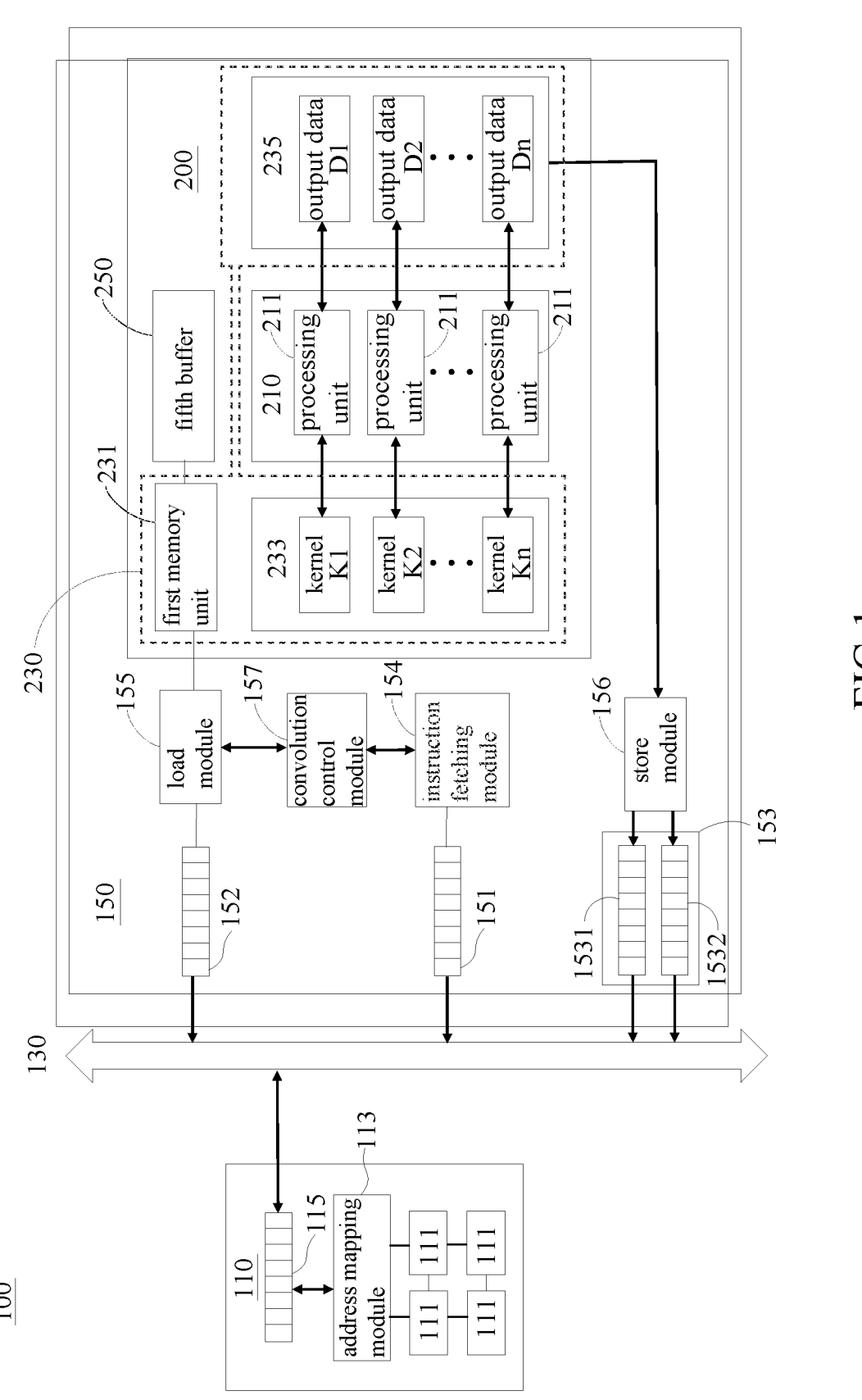
FIG. 1 illustrates a schematic structural diagram of an accelerator system according to one embodiment of the present disclosure.

As shown in FIG. 1, FIG. 1 illustrates a schematic structural diagram of an accelerator system 100 according to one embodiment of the present disclosure. The accelerator system 100 is suitable for deep learning architectures, especially for convolutional neural network architectures, in which the overall computational performance can be effectively improved. In an embodiment, as shown in FIG. 1, the accelerator system 100 may include an off-chip memory 110, a bus 130, and an accelerator 150. The accelerator 150 can be integrated into a chip for performing convolution operations, and the data to perform convolution operations is first stored in the off-chip memory 110 and is accessed via the bus 130 when the operations are performed.

The off-chip memory 110 includes a plurality of memory units 111, an address mapping module 113, and a first buffer 115. The memory units 111 are configured to store a plurality of instructions and data, such as the data of the input maps required for convolution operations and the data of the weights in the kernels, and so on. The address mapping module 113 is configured to allocate which data is stored at which address. In one embodiment, the off-chip memory 110 may be, for example, dynamic random-access memory (DRAM) or other similar types of memory. In one embodiment, all input data in the same channel of input map or all weights in the same kernel are stored in adjacent addresses as much as possible, in order to accelerate the load speed of input data during the computation.

In one embodiment, the bus 130 is electrically connected to the off-chip memory 110 and the accelerator 150, serving as a medium for data transfer between them. In one embodiment, the bus 130 can include a single bus or a combination of multiple buses. For example, the bus 130 may be selected from the group consisting of the following buses: industry standard architecture (ISA) bus, enhanced industry standard architecture (EISA) bus, system bus, PS/2 bus, peripheral component interconnect (PCI) bus, PCI-X bus, and personal computer memory card international association (PCMCIA) bus.

In the present embodiment, due to the significant latency in accessing data from the off-chip memory 130 compared to accessing data from the on-chip memory 230 or register units, the data bandwidth for reading and writing to the off-chip memory 130 (e.g., 64 bytes) is greater than the bandwidth of the bus 130 (e.g., 8 bytes, the size of one data) in order to increase the total data throughput. Consequently, the sizes of transferring data between the bus 130 and the off-chip memory 110 are different. Therefore, in the present embodiment, the address mapping module 113 can handle the transmission mechanism between the bus 130 and the off-chip memory 110. When the bus 130 issues a request, the address mapping module 113 loads the data of 64 bytes stored in the off-chip memory 110. If the request is "read", the address mapping module 113 extracts the data from the target address in these 64-byte data and returns it via the bus 130. If it is not "read", the address mapping module 113 modifies the data transferred via the bus 130 to the target address in the 64-byte data and stores the entire modified 64-byte data in the off-chip memory 110.

Since the accelerator system of the present disclosure is particularly for processing convolution operations, the data locality of the data to be processed (data loaded from the off-chip memory 110) is relatively high. That is, after the 64-bytes data to be computed once is loaded, there is a high possibility that the next loading 64-bytes data to be computed be located at the address adjacent to this loaded 64-bytes data. Therefore, in the present embodiment, the off-chip memory 110 further includes a first buffer 115, which can store data of the same size as the bandwidth of the off-chip memory 130, such as 64 bytes, and thus eight data can be stored at the same time. The first buffer 115 always stores 64-byte data in the address next to the read 64-byte data, i.e., the 64-byte memory block aligned with the 64-byte where the previous read data is located. Therefore, when the bus 130 has a read request, the bus 130 can directly extract the data in the target address from the first buffer 115 by the address mapping module 113, rather than extracting it from the memory unit 111, thereby greatly reducing the latency of data access. If the request issued by the bus 130 is "write", the data may be first written into the first buffer 115 and marked as dirty data. In the present embodiment, only when the address of the data to be read is different from the address stored in the first buffer 115 or when there is dirty data to be removed (i.e., to be written to the memory unit 111), the data is read from or written into the memory unit 111 of the off-chip memory 110.

In one embodiment, the accelerator 150 may include a second buffer 151, a third buffer 152, a fourth buffer 153, an instruction fetching module 154, a load module 155, a storage module 156, a convolution control module 157, and a computation module 200. The second buffer 151, the third buffer 152, and the fourth buffer 153 are electrically connected to the bus 130. The instruction fetching module 154 is electrically connected to the second buffer 151 and configured to fetch at least one instruction from the off-chip memory 110 via the bus 130. The load module 155 is electrically connected to the third buffer 152 and configured to load at least one input data from the off-chip memory 110 via the bus 130. The storage module 156 is electrically connected to the fourth buffer 153 and is configured to store at least one output data to the off-chip memory 110 via the bus 130.

In the present disclosure, the accelerator 150 is suitable for improving the performance of convolution operations, and thus further includes a convolution control module 157, which is electrically connected to the instruction fetching module 154, the load module 155, and the storage module 156. The convolution control module 157 can allocate the input data (especially the input map and kernel data) loaded by the load module 155 from the off-chip memory 110 to the processing units in the computation module 200 for processing based on the instructions fetched by the instruction fetching module 154 to perform convolution operations. The computation module 200 is electrically connected to the convolution control module 157, the load module 155, and the storage module 156. In an embodiment, the computation module 200 may include a processing unit array 210, an on-chip memory 230, and a fifth buffer 250. The processing unit array 210 includes a plurality of one-dimensional processing units 211, and each of the processing units 211 is configured to perform convolution operations based on the instructions received by the convolution control module 157. In one embodiment, each processing unit 211 includes a plurality of multiply-accumulate units (MAC) (not shown in the figure) for performing multiply-accumulate operations.

In one embodiment, the on-chip memory 230 may be, for example, static random-access memory (SRAM) or other similar types of memory. Specifically, the on-chip memory 230 is a memory system embedded in the accelerator 150. Therefore, the read and write speed of the on-chip memory are faster than that of the off-chip memory 110, but the capacity of the on-chip memory is smaller than that of the off-chip memory 110. In an embodiment, the on-chip memory 230 may include a first memory unit 231, a second memory unit 233, and a third memory unit 235. The first memory unit 231 is configured to store input data (such as input maps) loaded from the off-chip memory 110 by the load module 155. The second memory unit 233 is configured to store weight values in the kernels K1 to Kn loaded from the off-chip memory 110 by the load module 155, wherein each kernel includes a different number of weight values based on its size. The third memory unit 235 is configured to store the results of convolution operations performed by the processing unit array 210, such as output data D1, D2, . . . , Dn, which may form corresponding output maps or feature maps.

In an embodiment, when each processing unit 211 performs the computation, the next data to be processed can be first transferred from the first memory unit 231 and temporarily stored in the fifth buffer 250. In this way, the processing unit 211 does not need to request and wait for the data to be processed from the first memory unit 231, but can directly access to the fifth buffer 250, thereby reducing the waiting time for data access.

In the off-chip memory 110 of the present disclosure, the first buffer 115 is provided to reduce the latency on accessing to the memory unit 111. However, when the accelerator 150 frequently issues the request for reading from the off-chip memory 110 and the following request for writing into the off-chip memory 110 (and vice versa), instead of repeating the same operation (i.e., continuously reading or continuously writing), which results in decreasing the efficiency of the first buffer 115. As previously described, due to the high locality of the read data, there is a high possibility of hitting the data to be processed by storing it in the first buffer 115, thereby reducing the possibility of miss and requiring further data access to the memory unit 111. However, when the accelerator 150 issues a read request followed by a write request, it results in other data in the 64-byte data (stored in the first buffer 115), which is previously loaded, to be replaced by the written data when they have not been loaded for computations, thereby lowering the utilization. Next time when loading them, the request for loading is still need to be issued and the data have to be reloaded in the first buffer 115 from the memory unit 111 again.

Therefore, in the present embodiment, the accelerator 150 is further provided with the second buffer 151, the third buffer 152, and the fourth buffer 153. The first buffer 115, second buffer 151, third buffer 152, fourth buffer 153, and fifth buffer 250 may be, for example, register units, which have faster read and write speeds compared to the on-chip memory 230, but their capacities for storing data are relatively limited to avoid occupying too much space in the accelerator system 100. In one embodiment, the size of the data that the first buffer 115, second buffer 151, and third buffer 152 can temporarily store is the same, such as 64 bytes, while the data size that the fourth buffer 153 can temporarily store is twice the data size that any one of the first buffer 115, second buffer 151, and third buffer 152 can temporarily store, such as 64×2 bytes. The unit of the data that can be stored in each memory unit 111 is 8 bytes. Therefore, the maximum number of data which the first buffer 115, second buffer 151, and third buffer 152 can temporarily store is eight, while the maximum number of data the fourth buffer 153 can temporarily store is sixteen.

In one embodiment, when the convolution control module 157 requests instructions to be executed, the request is issued by the instruction fetching module 154 to the off-chip memory 110 via the bus 130. The requested instructions may be temporarily stored in the first buffer 115, and then transferred to and temporarily stored in the second buffer 151 via the bus 130. When the instruction fetching module 154 needs to access these instructions, it may load the instructions directly from the second buffer 151 and transferred them to the convolution control module 157. Due to the high data locality, the possibility of these instructions being sequentially executed is relatively high, and thus the times of accessing data from the off-chip memory 110 can be reduced, thereby reducing data access latency.

Similarly, when the convolution control module 157 requests input data to be calculated (such as input maps and convolutional kernels), the request is issued by the load module 155 to the off-chip memory 110 via the bus 130. The requested input data may be temporarily stored in the first buffer 115, and then transferred to and temporarily stored in the third buffer 152 via the bus 130. When the load module 155 needs to access these input data, it may load the input data directly from the third buffer 152 and transferred them to the first memory unit 231 or second memory unit 233 of the computation module 200. Due to the high data locality, the possibility of these input data being executed by the computation module 200 is relatively high, and thus the times of accessing data from the off-chip memory 110 can be reduced, thereby reducing data access latency.

Moreover, while the instructions or data loaded from the off-chip memory 110 are stored in the first buffer 115, the instructions or data are transferred via the bus 130 and stored in the second buffer 151 or third buffer 153. Therefore, even if a next request for writing is executed and the data in the first buffer 115 is updated, the instructions stored in the second buffer 151 or the input data stored in the third buffer 153 is not affected, and thus the times of accessing data from the off-chip memory 110 are still reduced.

Similarly, when the computation module 200 finishes convolution operations and obtains multiple output data D1-Dn (e.g., output maps), a request for storing these output data in the off-chip memory 110 is issued by the storage module 156 via the bus 130. The storage module 156 may temporarily store the output data in the fourth buffer 153 and issue the request to the off-chip memory 110 via the bus 130. After determining the address in the off-chip memory 110, the data temporarily stored in the fourth buffer 153 is temporarily stored in the first buffer 115 via the bus 130, and then moved from the first buffer 115 to the specified address of the memory unit 111 by address mapping module 113.

In an embodiment, the fourth buffer 153 includes a first buffer unit 1531 and a second buffer unit 1532, wherein the size of the data that the first buffer unit 1531 can temporarily store is equal to the size of the data that any one of the second buffer unit 1532, the first buffer 115, the second buffer 151, and the third buffer 152 can temporarily store, i.e., 64 bytes. When the storage module 156 requests for storing the output data in the off-chip memory 110, the requested output data may be temporarily stored in one of the first buffer unit 1531 and the second buffer unit 1532. Only when the space of the one of the first buffer unit 1531 and the second buffer unit 1532 is full, the storage module 156 temporarily stores other output data in another of the first buffer unit 1531 and the second buffer unit 1532, and all output data of the one of the first buffer unit 1531 and the second buffer unit 1532 are transferred via the bus 130 and temporarily stored in the first buffer 115. Then they are stored in the memory unit 111 of the off-chip memory 110 via the first buffer 115.

Further, when the storage module 156 requests for storing the output data in the off-chip memory 110, the storage module 156 may first determine which one of the first buffer unit 1531 and the second buffer unit 1532 has stored data. If the first buffer unit 1531 has stored the data, the storage module 156 may continue to write the output data into the first buffer unit 1531 until the space of the first buffer unit 1531 is full of data, i.e., eight data are stored. At this time, if the storage module 156 would like to write the data into the fourth buffer 153, it writes the data into the second buffer unit 1532, and the data of the first buffer unit 1531 are transferred to the first buffer 110 via the bus 130 and the data in the first buffer unit 1531 are removed. During the write operation, the waiting time for the response from the address mapping module 113 is long. In order to avoid the situation where the storage module 156 needs to write data into the fourth buffer 153 but cannot write it (i.e., the space that can be temporarily stored is full), the size of the fourth buffer 153 in the present embodiment is twice that of the other buffers, i.e., a unit with two other buffer sizes, and thus the writing can be still executed while waiting for the response from the address mapping module 113. The data of the full one of the buffer units is transferred to the first buffer 115 after the address mapping module 113 responds, and the data in said buffer unit are removed.

By providing the first buffer 115, second buffer 151, third buffer 152, and fourth buffer 153 described above, when data/instructions are to be loaded from or stored in the off-chip memory 110, it is unnecessary for the accelerator 150 to performing the read/write operation only after receiving the response from the address mapping module 113, but the data/instructions can be temporarily stored in the corresponding buffer and the following computations can be performed. The read or write can be executed in the corresponding buffer after the address mapping module 113 responds, which reduces the latency of memory access, thereby improving the performance of the computation.

The present disclosure does not only improve the overall data transmission architecture between the accelerator 150 and the off-chip memory 110, but also modifies the convolution operations executed by the accelerator, so as to further enhance the computational performance.

The accelerator 150 illustrated in FIG. 1 may be used for deep learning architectures, particularly for performing convolutional operations. However, convolutional operations may include general convolutional operations performed in full layer and depthwise separable convolution operations proposed by Google. Due to the advancement of network technology and the rapid development of artificial intelligence, even though the performance of hardware components has greatly improved compared to the past, they still cannot effectively process large amounts of data in real-time. Therefore, Google proposes a new algorithm for the original convolutional full layer operations, which is divided into two convolutional operation steps, namely depthwise convolution and pointwise convolution, to reduce the number of convolutional kernels to be computed.

Figure 2:
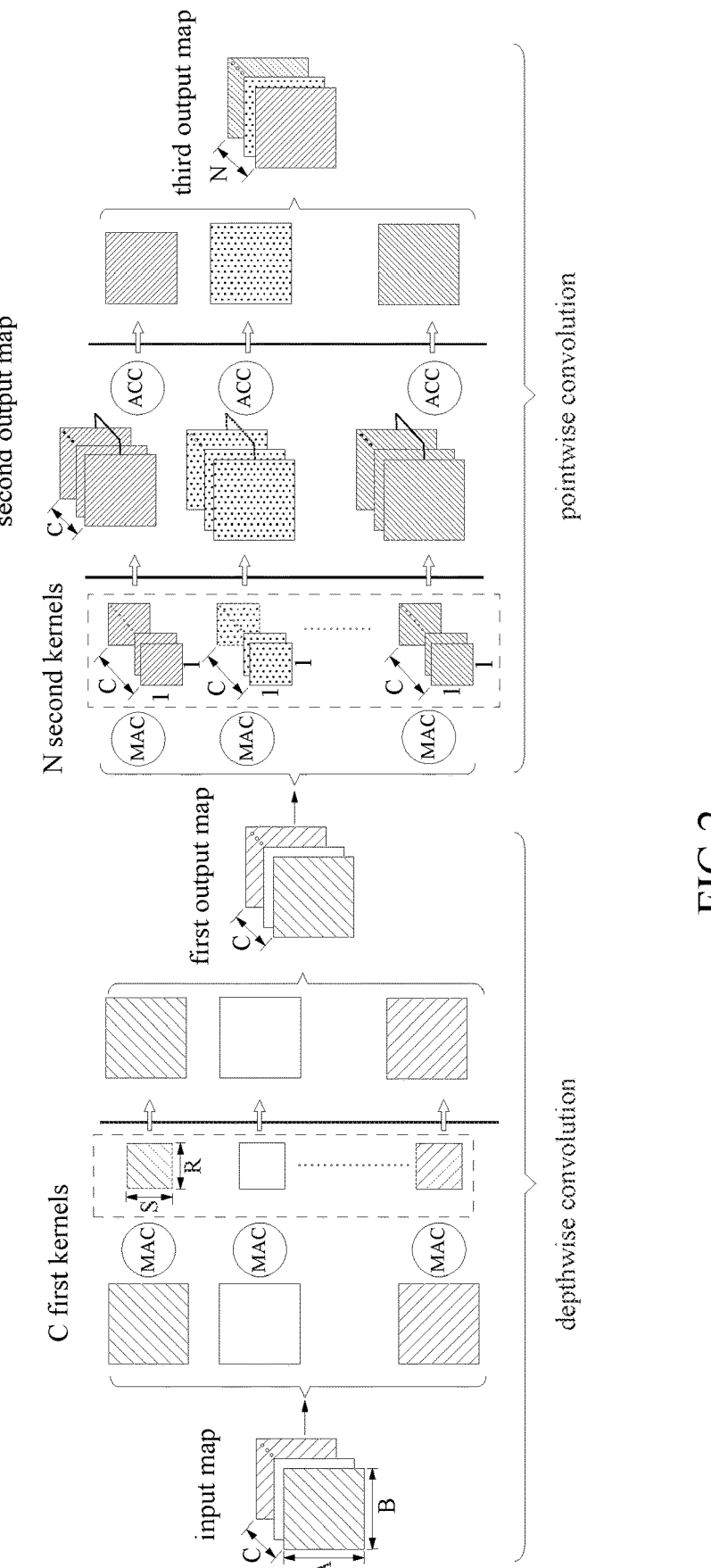
FIG. 2 illustrates a schematic process diagram of a depthwise separable convolution method according to one embodiment of the present disclosure.

The present disclosure provides an improved method for this depthwise separable convolution. The reference is made to FIG. 2. FIG. 2 illustrates a schematic process diagram of a depthwise separable convolution method according to one embodiment of the present disclosure. As shown in FIG. 2, the depthwise separable convolution method is performed on an input map of size of A×B×C, wherein A, B, and C are the height, width, and the number of channels of the input map, respectively. The depthwise separable convolution method may be divided into divided into a depthwise convolution step and a pointwise convolution step. In the depthwise convolution step, the convolution operation is only performed in a two-dimensional space, that is, the multiply-accumulate operation is performed on the input map of each channel (i.e., the input map of the first channel to the input map of the $C_{th}$ channel) with the corresponding first kernel by the multiply-accumulate unit MAC in the processing unit 211. The size of the first kernel is S×R, wherein S and R are the height and width of the firs kernel, respectively, and the number of first kernels is C. In other words, the number of the first kernels is equal to the number of the channels in the input map. Therefore, after performing the depthwise convolution step, C first output maps can be obtained. Since the number of the channels (the depth) is not taken into consideration in the depthwise convolution operation, the pointwise convolution step is further required in order to finish all convolution operations.

In the pointwise convolution step, the multiply-accumulate operation is performed on the C first output maps obtained from the depthwise convolution step with N second kernels of size of 1×1×C by the multiply-accumulate unit MAC, thereby obtaining N second output maps. Next, the accumulation operation is performed on the data in the same position of each second output map in different channels (i.e., the first second output map to the $N_{th}$ second output map) by the accumulation unit ACC to obtain N third output maps, which is the result of the convolution operations. In this step, since the height and width of the second kernel is 1×1, the actual number of the kernels is only related to the number of the channels in the original input map. Therefore, the number of the kernels required for convolution operations can be significantly reduced. Compared to performing full layer convolution operations, the number of kernels required to perform depthwise separable convolution operations can be significantly reduced due to that it is divided into two steps.

In the accelerator 150 of the present embodiment, when performing full layer convolutional operations, multiple processing units 211 in the processing unit array 210 are used to perform multiply-accumulate operations with different weights for the same input data, in order to avoid repeated access to the same input data and reduce the latency for accessing data from the off-chip memory 110. However, when performing depthwise separable convolution operations, since the number of the channels in the input map is not taken into account in the depthwise convolution step, there is no situation where the same input data can be shared. In other words, when performing depthwise separable convolution operations, the operation is performed on the input map of each channel with a corresponding first kernel, and the same first kernel fails to be performed with the input maps of different channels. Therefore, it is impossible to use multiple processing units 211 in the unit array 210 to perform operations on the same input data parallelly (only one processing unit 211 has a kernel corresponding to the input map), which results in low utilization of the processing units 211 in the processing unit array 210. For example, if the number of the channels N=32, in the original computation method, 32 output channels can be computed simultaneously for each input channel. However, in depthwise convolution operations, for each input channel, only one single channel kernel is calculated and is output to the corresponding output channel. Therefore, the utilization of the processing units 211 is 1/32.

Figure 3:
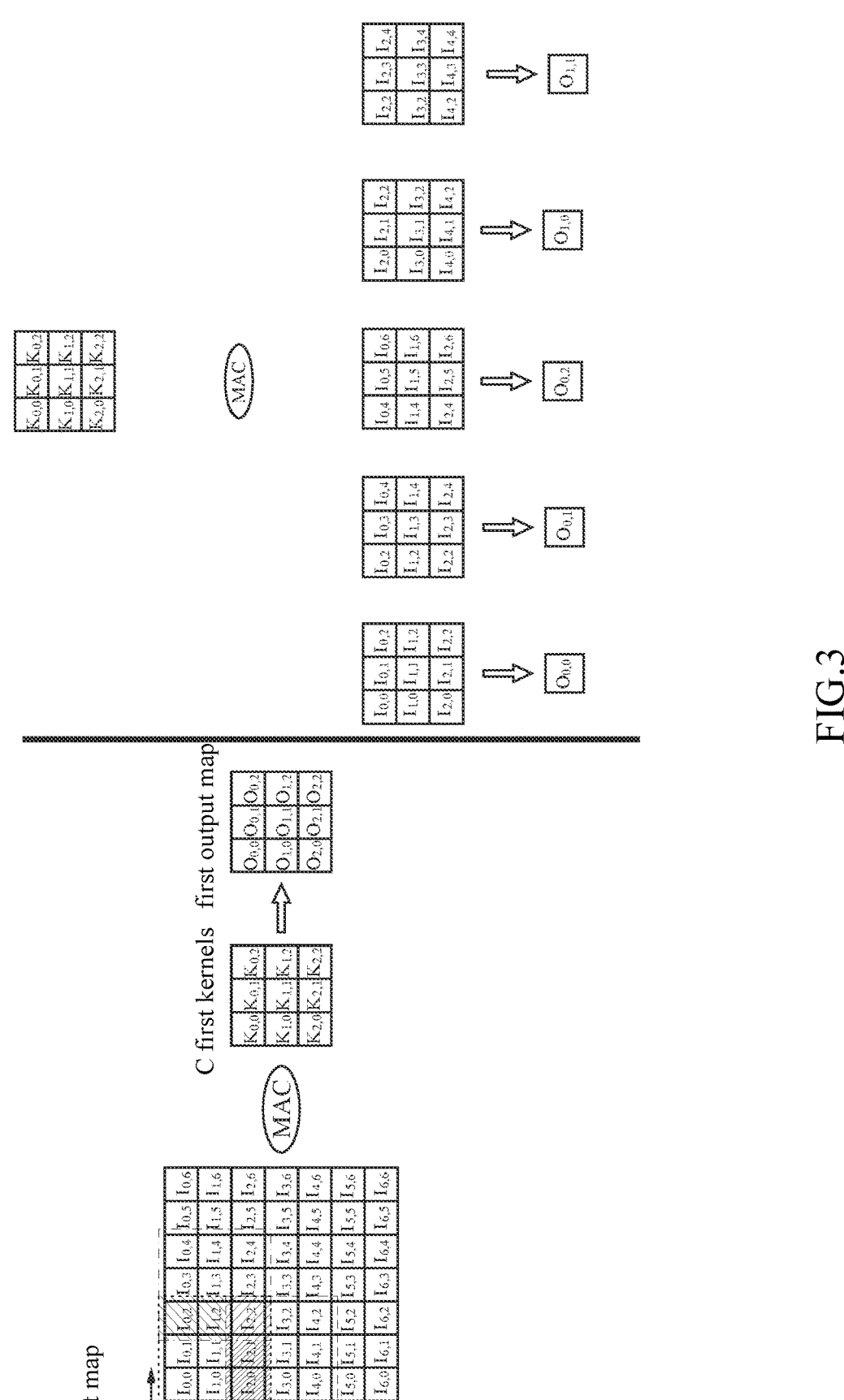
FIG. 3 illustrates a schematic diagram of the depthwise convolution step using the same kernel according to one embodiment of the present disclosure.

Accordingly, the present disclosure provides an improved method. In response to performing depthwise separable convolution operations instead of full layer convolution operations by the computation module 200 of the accelerator 150, each processing unit 211 of the computation module 200 parallelly performs the multiply-accumulate operation on different data in a partial input map extracted from the input maps of the same channel based on the same kernel in the depthwise convolution step, as shown in FIG. 3. In FIG. 3, the size of the extracted partial input map from the input map of A×B is, for example, 7×7. It includes a total of 49 input data from $I_{0,0}$-$I_{6,6}$. When performing convolution operations on the extracted partial input map, the same kernel can be used, with the size such as 3×3. It includes 9 weight values from $K_{0,0}$-$K_{2,2}$. Firstly, the convolution operations are parallelly performed by each processing unit 211 (e.g., nine) on the first input data ($I_{0,0}$, $I_{0,1}$, $I_{0,2}$, $I_{1,0}$, $I_{1,1}$, $I_{1,2}$, $I_{2,0}$, $I_{2,1}$, $I_{2,2}$), the second input data ($I_{0,2}$, $I_{0,3}$, $I_{0,4}$, $I_{1,2}$, $I_{1,3}$, $I_{1,4}$, $I_{2,2}$, $I_{2,3}$, $I_{2,4}$), the third input data ($I_{0,4}$, $I_{0,5}$, $I_{0,6}$, $I_{1,4}$, $I_{1,5}$, $I_{2,4}$, $I_{2,5}$, $I_{2,6}$), the fourth input data ($I_{2,0}$, $I_{2,1}$, $I_{2,2}$, $I_{3,0}$, $I_{3,1}$, $I_{3,2}$, $I_{4,0}$, $I_{4,1}$, $I_{4,2}$), and the fifth input data ($I_{2,2}$, $I_{2,3}$, $I_{2,4}$, $I_{3,2}$, $I_{3,3}$, $I_{3,4}$, $I_{4,2}$, $I_{4,3}$, $I_{4,4}$) of the partial input map mapped by the kernel with the weights ($K_{0,0}$-$K_{2,2}$) in the kernel to obtain the output data $O_{0,0}$, $O_{0,1}$, $O_{0,2}$, $O_{1,0}$, and $O_{1,1}$. Next, the convolution operations are parallelly performed by each processing unit 211 on the sixth input data, . . . , and ninth input data (the mapped input data obtained by moving the kernel according to the above rules) with the same weights in the kernel to obtain the output data $O_{1,2}$, $O_{2,0}$, $O_{2,1}$, $O_{2,2}$, and so on. After the convolution operation performed on this partial input map with the kernel is completed, the same steps are performed on the next extracted other partial input map with the same kernel ($K_{0,0}$-$K_{2,2}$), until all operations on the input map of this channel are completed. In this way, before completing the input map of each channel, the weights in the kernel are stored in the second memory unit 233. Therefore, only the data to be processed of the input map need to be updated, and the processing units 211 do not need to request different kernels (i.e., different weights) from the off-chip memory 110 again. Each processing unit 211 can also perform computations parallelly, without waiting for different kernels to perform computations, thereby improving the utilization of the processing units 211. Further, in the original computation, each input channel is broadcasted to N kernels, but (N−1) kernels are invalid (not used for computation) during the depthwise convolution step. In the present disclosure, the method is modified by broadcasting a kernel to the N sliding windows of the input, N data of the same channel can be generated simultaneously, and N processing units 211 can be operated parallelly. Therefore, the utilization of the processing units 211 can reach 100%.

Figure 4:
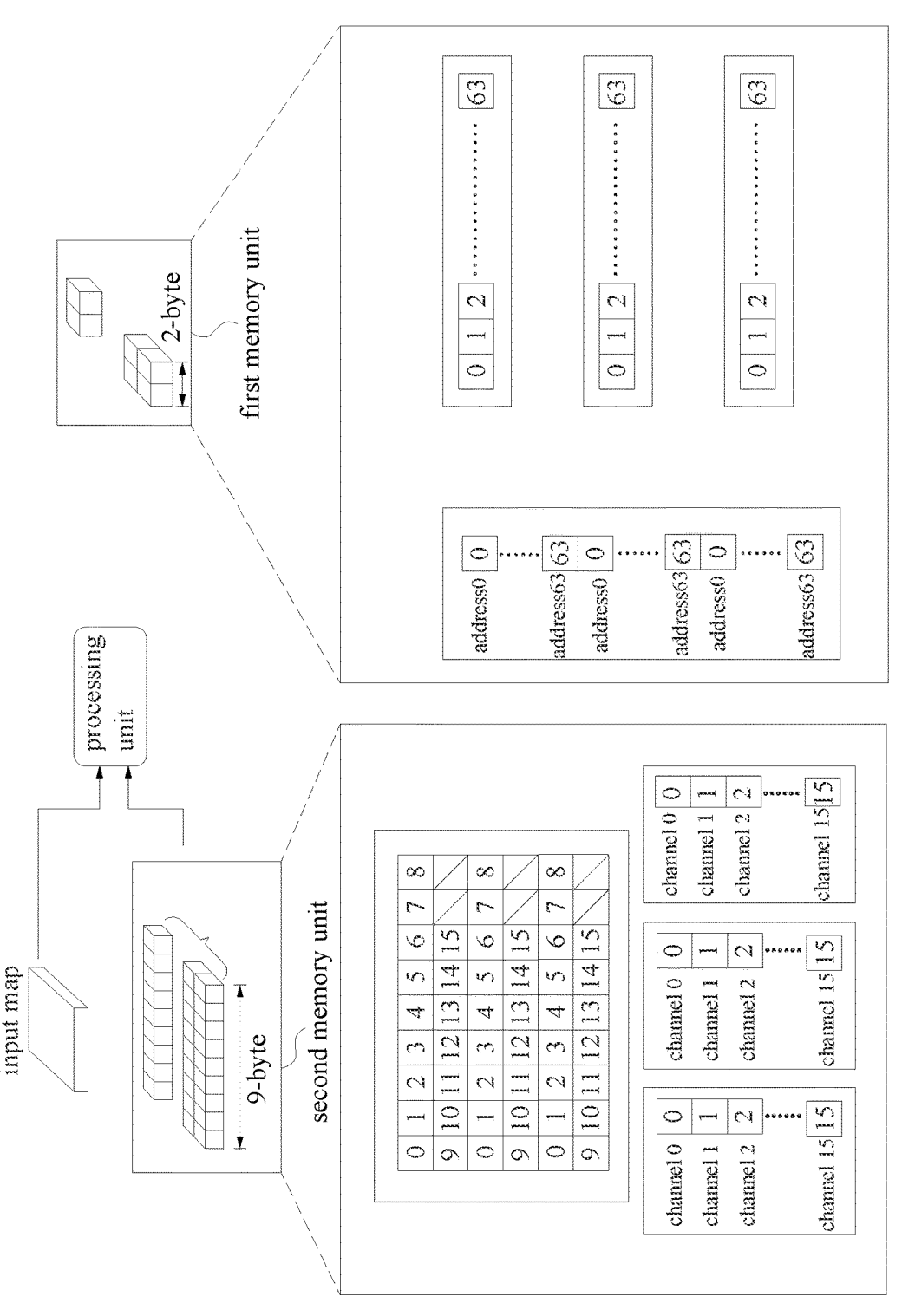
FIG. 4 illustrates a schematic diagram of the pointwise convolution step in which the wights of the kernel are stored in the weight memory according to one embodiment of the present disclosure.

On the other hand, in the pointwise convolution step, due to that the height and width of the second kernel are only 1×1. Therefore, the number of the weights for each second kernel is essentially the same as the number of the channels in the input map. In order to increase the speed of accessing weight values, in one embodiment, in the pointwise convolution step, for M weight values in each of the second kernels, these M weight values are sequentially stored in the second memory unit 233 with consecutive addresses. As shown in FIG. 4, the weight values of 16 channels in each second kernel are continuously stored in adjacent addresses, so that all corresponding weight values can be obtained at once during access, thereby reducing the request latency. Specifically, the direction of the original computation's continuous access is to continuously access data in the same input channel. However, in the pointwise convolution step of the present disclosure, the data that crosses channels but is located at the same point is continuously arranged, so that continuous access can be directly performed during computation.

To sum up, in the architecture of the accelerator system provided in the present disclosure, the operation of accessing or writing data to the off-chip memory can reduce the number of accesses and waiting time, thereby reducing the overall latency. Using said accelerator system to perform the depthwise separable convolution method, the utilization of the processing units can be enhanced by performing the multiply-accumulate operation on different data in the input map with the same channel based on the same kernel, thereby improving the performance of the accelerator system.

Although the present disclosure has been disclosed in preferred embodiments, it is not intended to limit the scope of the present disclosure. Those skilled in the art can make various changes and modifications without departing from the spirit and scope of the present disclosure. Therefore, the protection scope of the present disclosure should be determined by the appended patent claims."

What is claimed is:

1. An accelerator system, comprising:
an off-chip memory comprising a first buffer;
a bus electrically connected to the off-chip memory; and
an accelerator electrically connected to the bus, comprising:
    a second buffer electrically connected to the bus;
    a third buffer electrically connected to the bus;
    a fourth buffer electrically connected to the bus;
    an instruction fetching module electrically connected to the second buffer, and configured to fetch at least one instruction from the off-chip memory via the bus;
a load module electrically connected to the third buffer, and configured to load at least one input data from the off-chip memory via the bus;
a storage module electrically connected to the fourth buffer, and configured to store at least one output data to the off-chip memory via the bus;
a convolution control module electrically connected to the instruction fetching module, the load module, and the storage module; and
a computation module electrically connected to the convolution control module, the load module, and the storage module, and configured to perform convolution computations based on an input map and a plurality of kernels allocated by the convolution control module;
wherein in response to a request from the accelerator for loading the at least one input data or the at least one instruction from the off-chip memory, the requested at least one input data or the requested at least one instruction is transferred from the off-chip memory and temporarily stored in the first buffer;
wherein in response to the request from the accelerator for loading the at least one instruction from the off-chip memory, the requested at least one instruction is transferred from the first buffer via the bus and temporarily stored in the second buffer, and the instruction fetching module fetches the at least one instruction from the second buffer and transfers the at least one instruction to the convolution control module.

2. The accelerator system according to claim 1, wherein in response to the request from the accelerator for loading the at least one input data from the off-chip memory, the requested at least one input data is transferred from the first buffer via the bus and temporarily stored in the third buffer, and the load module reads the at least one input data from the third buffer and transfers the at least one input data to the convolution control module or the computation module.

3. The accelerator system according to claim 1, wherein in response to a request from the accelerator for storing the at least one output data in the off-chip memory, the requested at least one output data is transferred from the convolution control module or the computation module by the storage module and temporarily stored in the fourth buffer.

4. The accelerator system according to claim 3, wherein in response to the request from the accelerator for storing the at least one output data in the off-chip memory, the requested at least one output data is transferred from the fourth buffer via the bus and temporarily stored in the first buffer, and stored in the off-chip memory via the first buffer.

5. The accelerator system according to claim 3, wherein a size of temporarily stored data of the first buffer unit is equal to a size of temporarily stored data of any one of the second buffer unit, the first buffer, the second buffer, and the third buffer.

6. The accelerator system according to claim 5, wherein in response to the request from the accelerator for storing the at least one output data in the off-chip memory, the requested at least one output data is temporarily stored in one of the first buffer unit and the second buffer unit, wherein when the space of the one of the first buffer unit and the second buffer unit is full, the storage module stores other output data to another of the first buffer unit and the second buffer unit, and all data in the one of the first buffer unit and the second buffer unit are transferred via the bus and temporarily stored in the first buffer.

7. A depthwise separable convolution method, performed on the input map by the computation module of the accelerator system according to claim 1, the size of the input map is A×B×C, wherein A, B, and C are a height, a width, and a number of channels of the input map, respectively, and the computation module comprises a plurality of processing units, wherein the depthwise separable convolution method comprises a depthwise convolution step and a pointwise convolution step, wherein the depthwise convolution step comprises:
    performing a multiply-accumulate operation, by the processing units, on the A×B input map of each channel according to a corresponding one of C S×R first kernels to obtain C first output maps, wherein S and R are a height and a width of the first kernels;
    wherein in the depthwise convolution step, each of the processing units parallelly performs the multiply-accumulate operation on different input data of a partial input map of the A×B input map in the $n_{th}$ channel based on the $i_{th}$ one of the C first kernels, wherein $1 \le i \le C$ and $1 \le n \le C$; and
    wherein the pointwise convolution step comprises:
    performing the multiply-accumulate operation, by the processing units, on the C first output maps according to N 1×1×C second kernels to obtain N second output maps; and
    for each of the N second output maps, performing an accumulation operation on the data in the same position with different channels to obtain N third output maps.

8. The depthwise separable convolution method according to claim 7, wherein the computation module further comprises a memory unit, where in the pointwise convolution step, for M weights of each of the N second kernels, the weights are sequentially stored in the memory unit with consecutive addresses.

* * * * *